(12) United States Patent
Le Corre et al.

(10) Patent No.: US 9,159,239 B2
(45) Date of Patent: Oct. 13, 2015

(54) METHOD FOR DYNAMICALLY DETERMINING THE POSITION OF THE STOP POINT OF AN AIRCRAFT ON A TERRAIN, AND ASSOCIATED SYSTEM

(71) Applicant: DASSAULT AVIATION, Paris (FR)

(72) Inventors: Nicolas Le Corre, Paris (FR); Sébastien Lepage, Courbevoie (FR); Alain Boucher, Feucherolles (FR)

(73) Assignee: DASSAULT AVIATION, Paris (FR)

( * ) Notice: Subject to any disclaimer, the term of this patent is extended or adjusted under 35 U.S.C. 154(b) by 123 days.

(21) Appl. No.: 14/089,535

(22) Filed: Nov. 25, 2013

(65) Prior Publication Data

US 2014/0148980 A1     May 29, 2014

(30) Foreign Application Priority Data

Nov. 27, 2012   (FR) ...................................... 12 03197

(51) Int. Cl.
     *G06F 19/00*     (2011.01)
     *G06G 7/70*     (2006.01)
     *G08G 5/00*     (2006.01)
     *G05D 1/00*     (2006.01)
     *G05D 1/06*     (2006.01)
     *G08G 5/02*     (2006.01)

(52) U.S. Cl.
    CPC ................ *G08G 5/00* (2013.01); *G05D 1/0083* (2013.01); *G05D 1/0676* (2013.01); *G08G 5/025* (2013.01)

(58) Field of Classification Search
CPC ... G05D 1/0083; G05D 1/0676; G08G 5/025; G08G 5/00
USPC .......................................................... 701/16
See application file for complete search history.

(56) References Cited

U.S. PATENT DOCUMENTS

2001/0052562 A1    12/2001   Ishihara et al.

FOREIGN PATENT DOCUMENTS

| FR | 2 897 593 | 8/2007 |
| FR | 2 903 801 | 1/2008 |
| FR | 2 906 066 | 3/2008 |
| FR | 2 914 770 | 10/2008 |

OTHER PUBLICATIONS

Search Report dated Jun. 17, 2013 for French Application No. 12 03197.

*Primary Examiner* — Maceeh Anwari
(74) *Attorney, Agent, or Firm* — Davidson, Davidson & Kappel, LLC

(57) ABSTRACT

The method according to the invention comprise the following steps, dynamic measurement of the current geographical position of the aircraft, and its current ground speed, calculation of a first length representative of a flight phase of the aircraft, and calculation of a second length representative of a ground phase of the aircraft, calculation of the position of the stop point based on the first length, the second length and the current geographical position. The calculation of the first length comprises a phase for dynamically estimating a distance traveled by the aircraft during at least part of a flare phase of the aircraft.

16 Claims, 6 Drawing Sheets

METHOD FOR DYNAMICALLY DETERMINING THE POSITION OF THE STOP POINT OF AN AIRCRAFT ON A TERRAIN, AND ASSOCIATED SYSTEM

CROSS-REFERENCE TO RELATED APPLICATIONS

This application claims benefit of French patent application serial number FR1203197, filed Nov. 27, 2012, which is herein incorporated by reference.

BACKGROUND OF THE INVENTION

1. Field of the Invention

The present invention relates to a method for dynamically determining the position of the stop point of an aircraft on a terrain, comprising the following steps:

dynamic measurement of the current geographical position of the aircraft, and its current ground speed;

calculation of a first length representative of a flight phase of the aircraft, and calculation of a second length representative of a ground phase of the aircraft;

calculation of the position of the stop point based on the first length, the second length and the current geographical position.

Such a method is intended to be implemented during the approach of the aircraft toward a terrain (for example, a landing strip) and during landing on that terrain.

The landing phase of an aircraft is a critical flight phase. In fact, during that phase, the pilot must manage to stop the aircraft on the runway, or must undertake a specific emergency procedure if he feels he will not be able to stop the aircraft before the end of the runway. The specific procedure is for example a go-around procedure if the speed of the airplane and the remaining length of the runway allow it.

2. Description of the Related Art

In this respect, statistical studies on aerial accidents having occurred in the last decade on commercial flights show that a majority of accidents take place during landing, and that the primary cause of approximately 18% of accidents is an exit of runway.

A significant share of these accidents are due, during the landing phase, to exit the length of runways. Several causes have been isolated for this type of accident, but in the majority of cases, the crew incorrectly estimated the ability to land the aircraft on the runway.

To offset this problem, systems and methods have been developed for allowing the pilot, during flight and/or on the ground, to estimate whether he will be able to land the aircraft in complete safety, and to estimate the braking capacities of the aircraft on the considered runway.

The estimate of the stop position of the airplane, presented to the crew during the approach and until the aircraft has come to a complete stop, is therefore information of great interest in terms of safety. This interest is even greater if the estimate accounts for the evolution of the system in real time.

In one known method, a minimal landing distance along the runway, until the aircraft is stopped, is calculated from the current position of the aircraft, from a standard descent plane toward the determined landing strip, and a performance model of the aircraft.

The calculation of the minimum landing distance comprises estimating a distance traveled above the runway during flight, based on the average flight time above the runway, and the estimate of a travel distance on the runway.

This method only considers the constant descent plane of the aircraft.

One aim of the invention is therefore to obtain a method for determining the stop point of an aircraft on the ground, which can be implemented during an approach phase and during rolling, and with improved precision.

To that end, the invention relates to a method of the aforementioned type, characterized in that the calculation of the first length comprises a phase for dynamically estimating a distance traveled by the aircraft during at least part of a flare phase of the aircraft.

SUMMARY OF THE INVENTION

The method according to the invention may comprise one or more of the following features, considered alone or according to any technically possible combination(s):

it comprises a step for measuring the current slope of the aircraft, the distance traveled by the aircraft during at least part of a flare phase of the aircraft being calculated as a function of the current slope of the aircraft;

during the estimation phase, the distance traveled by the aircraft during at least part of the flare phase of the aircraft is estimated as a function of the current ground speed of the aircraft, measured during the measuring step;

during the estimation phase, the distance traveled by the aircraft during at least part of the flare phase of the aircraft is estimated as a function of the load factor $n_{zarr}$ of the aircraft, estimated during flare thereof;

during the estimation phase, the distance traveled by the aircraft during at least part of a flare phase of the aircraft is estimated using the equation:

$$D2(t) = \int_0^{gamma(t)-\beta} \left[ \frac{1}{g \times (n_{zarr} - \cos(\gamma))} \times V_{sol}^2(t) \times \cos\left(\gamma + \frac{d\gamma}{2}\right) \right] \cdot d\gamma$$

where g is the acceleration of gravity, $\beta$ is the slope of the terrain, $n_{zarr}$ is the load factor of the aircraft estimated during flare, $V_{sol}(t)$ is the current ground speed of the aircraft, and gamma(t) is the current slope of the aircraft;

the estimating phase includes calculating an estimated height of the aircraft at which flare begins, the distance traveled by the aircraft during at least part of a flare phase of the aircraft being calculated from the estimated height;

the calculation of the first length includes a phase for estimating the distance traveled during the approach of the aircraft toward the terrain before flare and/or during a first part of the flare phase of the aircraft, the distance traveled during the approach of the aircraft toward the terrain before flare and/or during the first part of the flare phase of the aircraft being calculated as a function of the current measured slope of the aircraft, and advantageously, as a function of the current height of the aircraft relative to the terrain;

the step for calculating the second length includes a phase for calculating a distance representative of the transition from the current deceleration to the deceleration corresponding to an established braking of the aircraft, as a function of the current deceleration;

the distance representative of the transition from the current deceleration to the deceleration corresponding to the established braking is calculated as a function of a constant $K_{ms}$ representative of the dynamics of the aircraft between touchdown of the main landing gear and the establishment of the established braking;

the step for calculating the second length includes a phase for calculating a braking distance from a predetermined deceleration profile of the aircraft on the terrain, as a function of the current ground speed;

the predetermined deceleration profile is a constant deceleration;

the step for calculating the stop point includes determining the geographical position of the stop point based on the current geographical position of the aircraft, the first length, the second length, and a reading corresponding to the route of the aircraft.

The invention generally relates to a system for dynamically determining the position of the stop point of an aircraft on a terrain, comprising:

a unit for dynamically measuring the current geographical position of the aircraft and its current ground speed;

a unit for calculating a first length representative of a flight phase of the aircraft, and a unit for calculating a second length representative of a ground phase of the aircraft;

a unit for calculating the position of the stop point based on the first length, the second length and the current geographical position;

characterized in that the unit for calculating the first length comprises means for estimating a distance traveled by the aircraft during at least part of a flare phase of the aircraft.

The system according to the invention may comprise the following feature:

a unit for measuring the current slope of the aircraft, the estimating means being capable of calculating the distance traveled by the aircraft during at least part of a flare phase of the aircraft as a function of the current slope of the aircraft.

BRIEF DESCRIPTION OF THE DRAWINGS

The invention will be better understood upon reading the following description, provided solely as an example, and done in reference to the appended drawings, in which.

DETAILED DESCRIPTION

Figure 2:
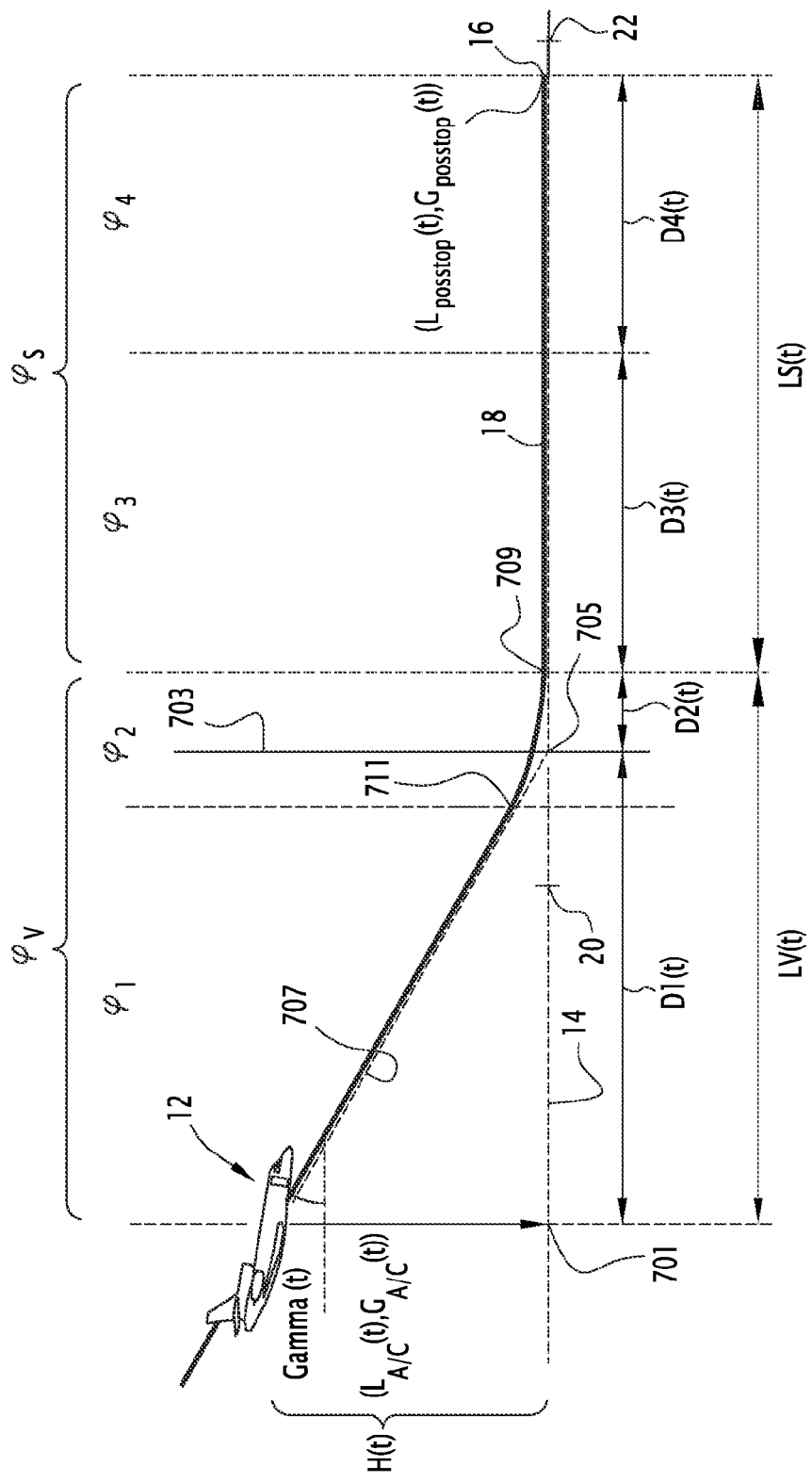
FIG. 2 is a view in the plane of the trajectory of the aircraft during its approach toward the ground, with the aircraft shown in its approach phase before the beginning of flare, to illustrate a first embodiment of the method according to the invention.

In FIG. 2, the evolution of an aircraft 12 between its current in-flight position and a stop position 16 on a terrain 14 includes an in-flight phase $\phi_v$ while the aircraft 12 is airborne and until the wheels touch down on the ground, and a ground phase $\phi_s$, from the time the wheels touch down on the ground until the aircraft 12 comes to a complete stop.

The in-flight phase $\phi_v$ includes a first phase $\phi_1$ in which the aircraft 12 approaches the terrain 14 following a first trajectory, for example a rectilinear trajectory with a constant slope, then a second so-called flare phase $\phi_2$, during which the pilot makes the transition between the airborne phase and the ground phase by reducing the slope of the aircraft 12 to decrease its vertical speed and ensure passenger comfort during that transition.

The ground phase $\phi_s$ includes a first phase $\phi_3$ during which the deceleration of the aircraft 12 varies until it reaches a value corresponding to maximum braking (for example, a constant value), then a second phase $\phi_4$ during which the deceleration of the aircraft 12 is the deceleration associated with the maximum braking, until the latter comes to a complete stop in its stopped position 16.

Figure 1:
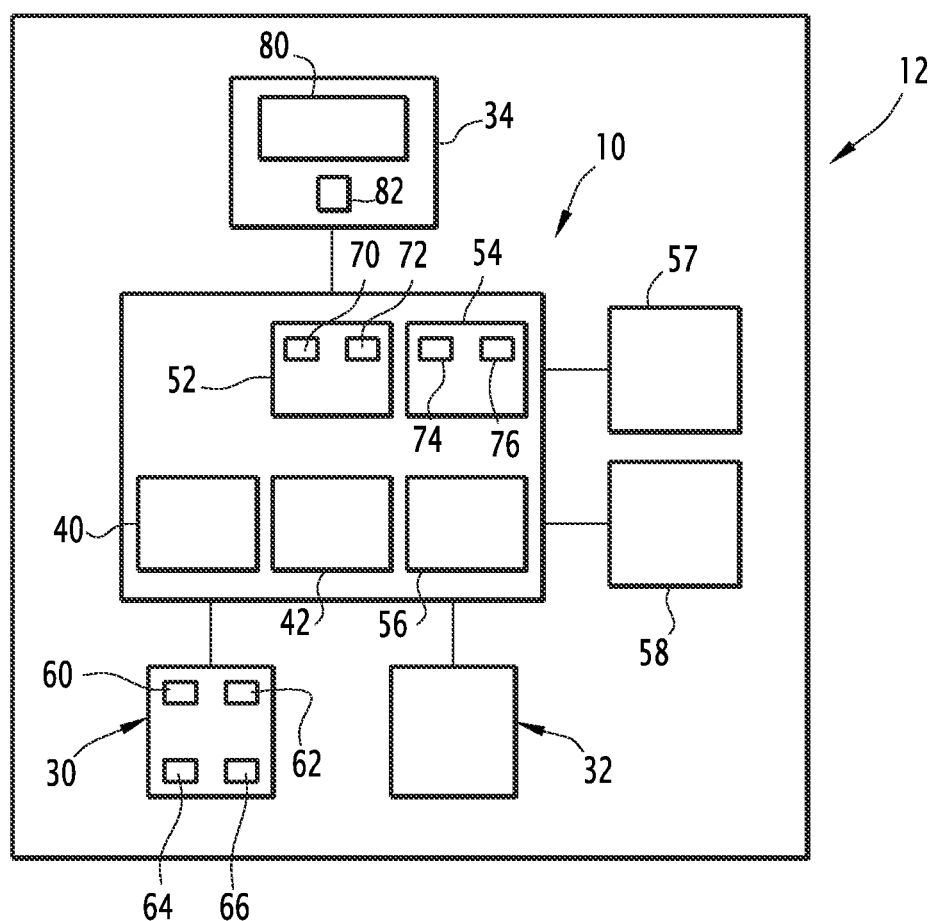
FIG. 1 is a diagrammatic view of an aircraft including a system intended to implement the method according to the invention.

A first system 10 for dynamically determining the position of the stop point of an aircraft 12 according to the invention is diagrammatically illustrated by FIG. 1.

In reference to FIG. 2, the system 10 is intended to determine, at any moment t during landing of the aircraft 12, toward the terrain 14, the geographical position of the stop point 16 of the aircraft 12 on the terrain 14.

As will be seen below, the geographical position of the stop point 16 is determined by its geographical coordinates, for example by its latitude $L_{pos\ stop}(t)$ and its longitude $G_{pos\ stop}(t)$. This determination is advantageously done independently of the position of a landing strip 18 shown diagrammatically in FIG. 2, the landing strip 18 having an upstream threshold 20 and a downstream threshold 22.

The system 10 is designed to provide the crew of the aircraft 12 with a real-time indication of the estimated position of the stop point 16, as a function of the current flight parameters of the aircraft 12, and in particular its current position ($L_{A/C}(t)$ $G_{A/C}(t)$), its current longitudinal deceleration relative to the ground $J_x(t)$, its current ground speed $V_{sol}(t)$, its current ground slope gamma(t), and its current height H(t) relative to the terrain 14.

Aside from the system 10, the aircraft 12 includes, in reference to FIG. 1, a measuring and positioning system 30, and a system 32 for monitoring airplane system failures. It further comprises a device 34 for displaying information relative to the stop point 16 of the aircraft 12 on the terrain 14.

The measuring and positioning system 30 for example includes sensors for measuring parameters related to the aircraft and its surroundings, such as the temperature, pressure or speed, its position, its altitude and its attitudes.

The system 32 is capable of monitoring and determining the current state of the systems of the aircraft 12 (particularly the braking systems) in particular, taking any failures on those systems into account.

The determination system 10 is connected to the measuring and positioning system 30 and the monitoring system 32. It includes at least one processor 40 and a memory 42.

According to the invention, the system 10 comprises a first unit 52 for calculating a first length LV(t) representative of the flight phase $\phi_v$ of the aircraft 12 and a second unit 54 for calculating a second length LS(t) representative of the ground phase $\phi_s$ of the aircraft 12.

The system 10 further includes a third unit 56 for calculating the stop point 16, based on the first length LV(t), the second length LS(t), and at least the current geographical position of the aircraft 12.

The system 10 is connected to a topographical database 57 and an aircraft 12 performance database 58.

The database 57 includes the topographical data relative to the terrain 14 in light of which the aircraft 12 is traveling. It advantageously includes information relative to the landing strips 18 present on the terrain 14, and in particular relative to the geographical position of the threshold 20, 22 of each runway 18.

The performance database 58 includes tables relative to the performance parameters of the aircraft 12 during its flare (load factors $n_{zarr}$) and during its braking on the ground.

In one particular embodiment, the load factor $n_{zarr}$ is considered to be constant during flare.

It further includes a table of braking performance data establishing the evolution of the deceleration $J_{x\ tab}$ of the aircraft 12 as a function of its current ground speed $V_{sol}(t)$. This evolution also depends on the configuration of the aircraft (in particular the position of the flaps), the braking performance of the aircraft 12, and optionally, the condition of the runway (wet, dry, contaminated).

In one particular embodiment, this deceleration $J_{x\ tab}$ is assumed to be constant as a function of time and equal to the constant deceleration $J_{x\ max}$ corresponding to the maximum braking of the aircraft 12.

The deceleration corresponding to the maximum braking of the aircraft $J_{x\ max}$ depends on the configuration of the aircraft 12, the braking performance of the aircraft 12, and the condition of the runway (wet, dry, contaminated).

The performance database 58 further comprises a table of constant data $K_{ms}$ representing the dynamics of the aircraft 12 between touchdown of the primary landing gear and establishment of maximum braking.

The positioning and measuring system 30 includes a first unit 64 dynamically measuring the current geographical position ($L_{A/C}(t)$; $G_{A/C}(t)$; $H(t)$) of the aircraft 12, a second unit 62 for measuring the current ground speed $V_{sol}(t)$ of the aircraft 12, and a third unit 64 for measuring the currents slope gamma(t) of the aircraft 12. It further includes a fourth unit 66 for measuring the current deceleration $J_x(t)$ of the aircraft 12.

The first unit 60 is connected to the position sensors. It is capable of dynamically determining the current position of the aircraft, i.e., its latitude $L_{A/C}(t)$, longitude $G_{A/C}(t)$, and height H(t) relative to the terrain 14, based on data received from the position sensors, and based on information received from the geographical database 57.

The second unit 62 is also connected to the sensors. It is capable of dynamically determining the current ground speed $V_{sol}(t)$ of the aircraft.

The third unit 64 is connected to position sensors. It is capable of dynamically determining the airplane ground slope gamma(t) based on data received from the sensors.

The fourth unit 66 is also connected to the sensors. It is capable of dynamically determining the current deceleration $J_x(t)$ of the aircraft 12.

The first calculation unit 52 is connected to the measuring assemblies 60 to 66.

Figure 3:
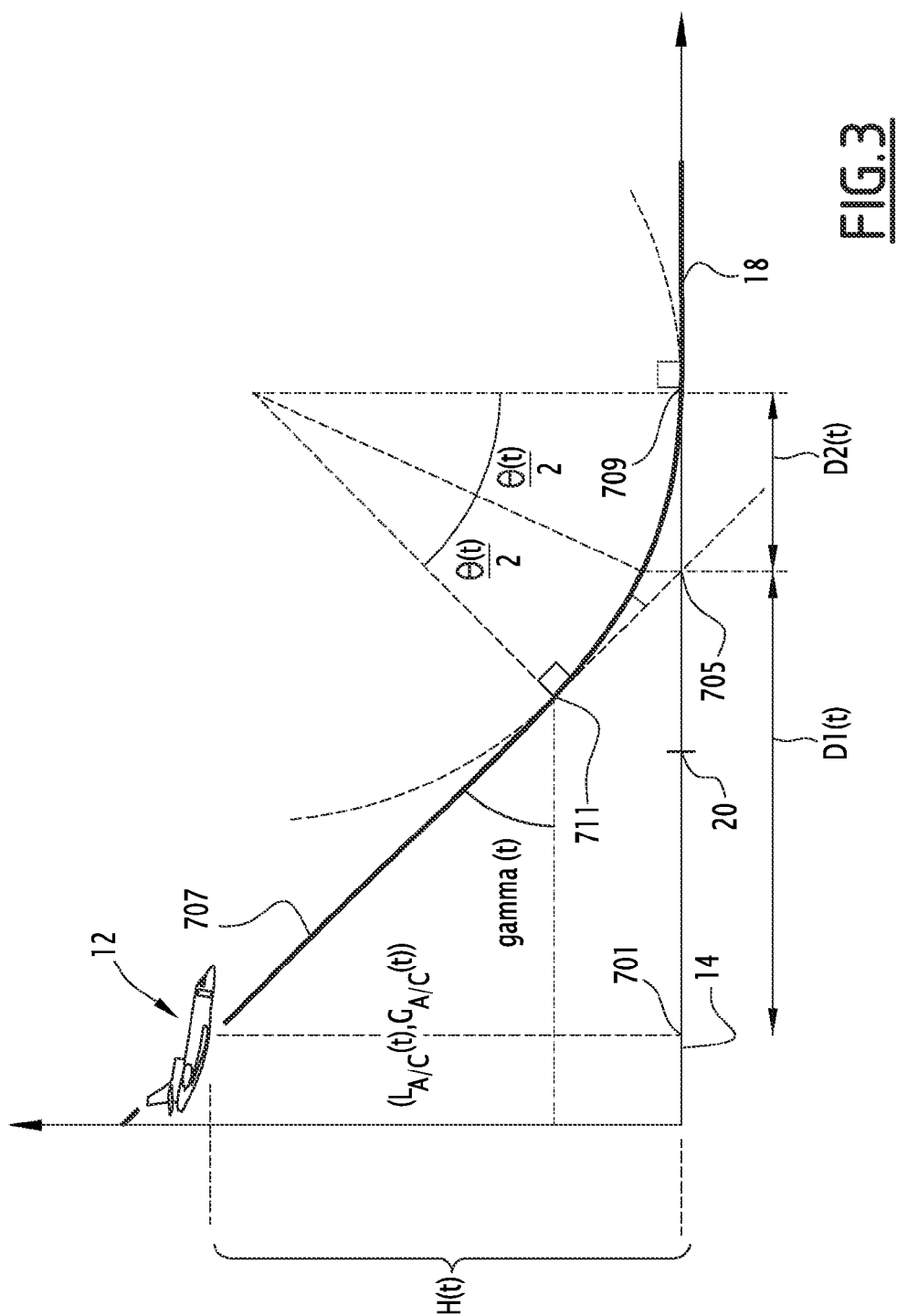
FIG. 3 is a view similar to FIG. 2, when the aircraft begins a flare phase.
Figure 4:
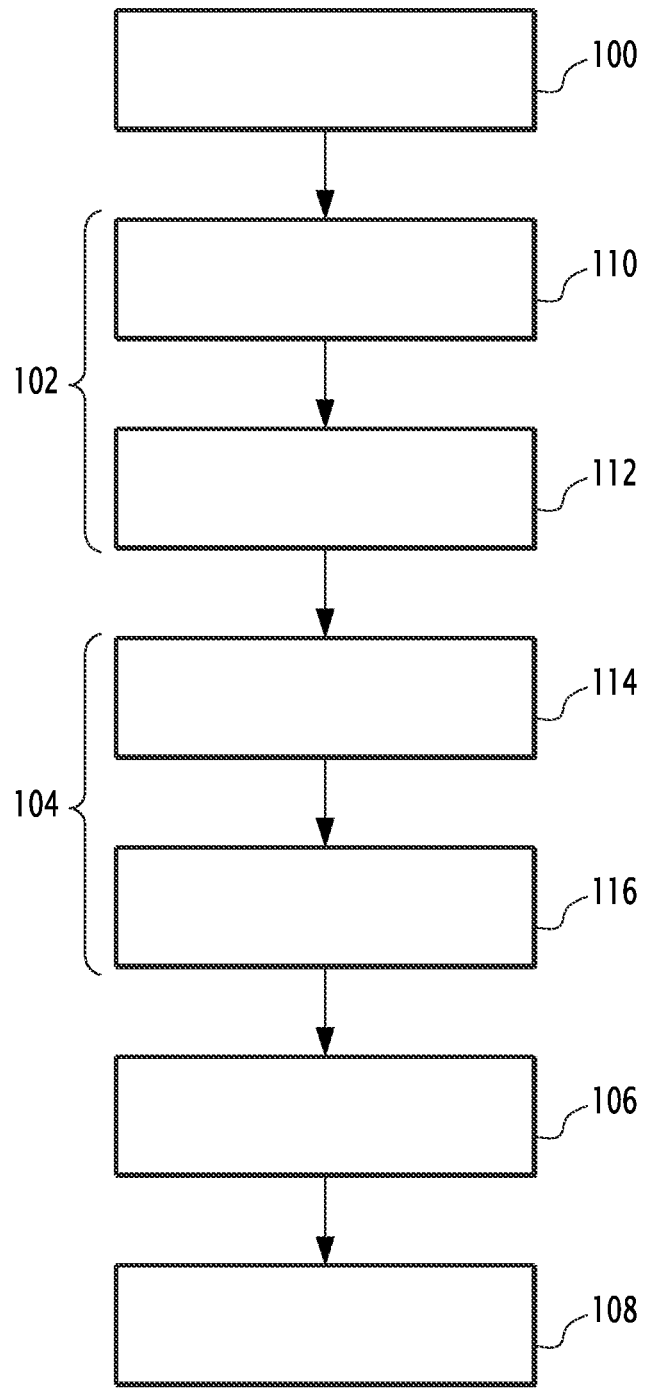
FIG. 4 is a logic diagram showing the different steps of the method according to the invention.

In a first embodiment illustrated in FIGS. 2 and 3, it includes means 70 for estimating a first distance D1(t) corresponding to the distance separating the projection 701 on the terrain 14 of the aircraft 12 during flight, and the vertical plane 703 passing through the intersection 705 of the current descent plane 707 with the terrain 14. It further includes means 72 for estimating a second distance D2(t) corresponding to the distance separating the vertical plane 703 from the touchdown point of the wheels 709 of the aircraft on the terrain 14.

In this embodiment, and relative to an assumed trajectory of the aircraft 12, as long as the aircraft 12 has not started the flare phase $\phi_2$, the distance D1(t) is representative of the approach phase $\phi_1$ and a first part of the flare phase $\phi_2$, while the distance D2(t) is representative of the second part of the flare phase $\phi_2$.

Once the aircraft 12 has begun the flare phase $\phi_2$, the distance D1(t) is representative of the first part of the flare phase $\phi_2$, while the distance D2(t) is representative of the second part of the flare phase $\phi_2$.

In one particular embodiment, the method according to the invention therefore consists of likening D2(t) to the projection of a half arc of circle θ(t)/2 of the flare, the flare being assumed to be done following a circular trajectory.

θ(t) and gamma(t) are linked by the following geometric relationship:

θ(t)=gamma(t)−β; β corresponding to the slope of the runway 18 (β being equal to 0 for a horizontal runway).

The first estimating means 70 are capable of dynamically calculating the distance D1(t) as a function of the current height H(t) of the aircraft 12 and its current slope gamma(t), for example using equation (1) below:

$$D1(t) = \frac{H(t)}{\tan[\text{gamma}(t)]} \quad (1)$$

In particular, when the current slope is small, equation (2) below may be rewritten in the form:

$$D1(t) = \frac{H(t)}{[\text{gamma}(t)]} \quad (2)$$

When the current slope is very close to zero, gamma(t) is then limited to a threshold value $\text{gamma}_{min}$.

The second estimating means 72 are capable of dynamically calculating the distance D2(t) as a function of the current ground speed $V_{sol}(t)$, the current airplane slope gamma(t), and the load factor $n_{zarr}$ of the aircraft 12, obtained from the performance database 58 and the acceleration of gravity g, for example using equation (3) below:

$$D2(t) = \int_0^{\frac{\text{gamma}(t)-\beta}{2}} \left[ \frac{1}{g \times (n_{zarr} - \cos(\gamma))} \times V_{sol}^2(t) \times \cos\left(\gamma + \frac{d\gamma}{2}\right) \right] \cdot d\gamma \quad (3)$$

In particular, when the flare is assumed to be circular, the load factor $n_{zarr}$ is constant. With the small angle hypothesis, equation (3) may be simplified in the form of the following equation (4):

$$D2(t) = \frac{1}{2 \times g \times (n_{zarr} - 1)} \times V_{sol}^2(t) \times (\text{gamma}(t) - \beta) \quad (4)$$

Actually taking the flare into account thus offers greater precision in estimating the stop position of the aircraft than those of the estimating methods of the prior art.

The second calculating unit 54 includes third means 74 for estimating the distance D3(t) necessary to transition, in the braking phase on the ground, from the current deceleration $J_x(t)$ to the deceleration corresponding to an established braking, in particular the maximum braking $J_{x\ frmax}$. The second calculating unit 54 further includes fourth means 76 for estimating the distance D4(t) traveled on the ground by the aircraft 12 during established braking.

The third estimating means 74 are capable of dynamically calculating the distance D3(t) as a function of the deceleration corresponding to established braking, in particular the maximum braking $J_{x\ frmax}$, from the current deceleration $J_x(t)$, and a constant $K_{ms}$ representing the dynamics of the aircraft 12 between touchdown of the main landing gear and the establishment of the established braking, as obtained from the performance database 58.

In particular, the distance D3(*t*) is estimated using the following equation (5):

$$D3(t) = K_{ms} \times J_{x\,frmax} - J_x(t)) \quad (5)$$

The fourth estimating means 74 are capable of dynamically calculating the distance D4(*t*) as a function of the estimated deceleration profile $J_{x\_tab}$ of the aircraft 12 on the ground, as it is calculated in the performance database 58.

This estimated profile $J_{x\_tab}$ is calculated as a function of the current ground speed $V_{sol}(t)$.

The distance D4(*t*) is obtained dynamically by integrating the function corresponding to that profile $J_{x\_tab}$ between the current moment t and the stop time tstop of the aircraft 12.

The means 74 to that end comprise means for calculating the stop time tstop of the aircraft. This stop time tstop is estimated using the calculated deceleration profile $J_x(V_{sol}(t), t)$ corresponding to the current ground speed $V_{sol}(t)$. It is for example obtained by the following system of equations (6):

$$\begin{cases} t_{stop} > 0 \\ \int_t^{t_{stop}} J_{x\_tab}(V_{sol}(t), t) \cdot dt = 0 \end{cases} \quad (6)$$

In the case where the deceleration profile is constant, and is for example equal to the deceleration corresponding to maximum braking $J_{x\,frmax}$, the stop time tstop is obtained by the following equation (7):

$$t_{stop} = -\frac{V_{sol}(t)}{J_{x\,fr\,max}} \quad (7)$$

The distance D4 is then obtained by the following equation (8):

$$D4(t) = \int_t^{tstop} [\int_t^{tstop} J_{x\_tab}(V_{sol}(t), t) \cdot dt] \cdot dt \quad (8)$$

In the case where the deceleration profile is constant, and is for example equal to the deceleration corresponding to the maximum braking $J_{x\,frmax}$, the distance D4(*t*) is calculated by the following equation (9):

$$D4(t) = -\frac{V_{sol}(t)^2}{2 \times J_{x\,fr\,max}} \quad (9)$$

The estimate of the horizontal distance L(t) separating the ground projection V of the current position of the aircraft from its estimated stop position is thus expressed:

$$L(t) = LV(t) + LS(t) = D1(t) + D2(t) + D3(t) + D4(t) \quad (10)$$

The third calculating unit 56 is capable of calculating the geographical coordinates ($L_{pos\,stop}(t)$; $G_{pos\,stop}(t)$) of the stop point 16, as a function of the current geographical coordinates of the aircraft 12 ($L_{A/C}(t)$; $G_{A/C}(t)$), the bearing χ(t), the estimate of the horizontal distance L(t) between the aircraft 12 and its stop point 16, and the average ground radius R0, with the hypothesis of a spherical earth.

The bearing χ(t) is the angle formed in the horizontal plane by an observer's line toward an object relative to true north.

It is advantageously taken to be equal to the ground route of the airplane, i.e., the angle formed by the ground speed vector of the airplane with true north.

The following formula is advantageously used to calculate the geographical coordinates ($L_{pos\,stop}(t)$; $G_{pos\,stop}(t)$):

$$\begin{bmatrix} L_{Posstop}(t) \\ G_{posstop}(t) \end{bmatrix} = \begin{bmatrix} \text{Arcsin}\left[\sin\left(\frac{L(t)}{R0}\right) \times \cos(L_{AC}(t)) \times \right. \\ \left. \cos(\chi(t)) + \sin(L_{AC}(t)) \times \cos\left(\frac{L(t)}{R0}\right)\right] \text{Arctan} \\ G_{AC}(t) + \text{Arctan}\left[\dfrac{\sin(\chi(t)) \times \sin\left(\frac{L(t)}{R0}\right)}{\cos\left(\frac{L(t)}{R0}\right) \times \cos(L_{AC}(t)) - \cos(\chi(t)) \times \sin(L_{AC}(t)) \times \sin\left(\frac{L(t)}{R0}\right)}\right] \end{bmatrix} \quad (11)$$

The display device 34 is for example positioned in the cockpit of the aircraft 12. It generally includes a viewer 80, such as a monitor, and a unit 82 for managing the display on the viewer 80. It is connected to the system 10, and in particular to the third calculating unit 56.

The management unit 82 is capable of extracting information received from the system 10, and in particular the position of the stop point 16 dynamically estimated by the system 10 to allow the display of information representative of that stop point 16 on the viewer 80. This information may be a symbol, a line, or a gauge.

The information is for example displayed on a geographical depiction of the terrain 14 present in front of the aircraft 12, and/or on a depiction of a landing strip 18 and its surroundings on the viewer 80.

A first method for dynamically determining the position of the stop point 16 of the aircraft 12 on a terrain 14 will now be described, in light of FIG. 3.

This method is implemented in a system 10 according to the invention, as described above.

The method according to the invention includes a step 100 for dynamically measuring current parameters of the aircraft 12, a step 102 for calculating a first length LV(t) representative of a flight phase of the aircraft 12, a step 104 for calculating a second length LS(t) representative of a ground phase of the aircraft 12, and a step 106 for calculating the position of the stop point 16 based on the first length LV, the second length LS(t) and the current geographical position of the aircraft 12.

The method further advantageously includes a step 108 for displaying information representative of the stop point 16 on a viewer 80 of the display device 34.

In step 100, the unit 60 for dynamically measuring the current geographical position measures the current position of the aircraft, i.e., its latitude LA/C(t), longitude GA/C(t), and height H(t) relative to the terrain 14, based on data received from the position sensors and information received from the geographical database 57.

The unit 62 dynamically measures the current ground speed Vsol(t) of the aircraft 12. The unit 64 dynamically determines the current airplane slope gamma(t).

Thus, at all moments t, the current geographical position of the aircraft 12 and its current slope gamma(t) are measured.

Step 102 includes a first phase 110 for estimating a distance D1(*t*) traveled during the approach of the aircraft 12 toward the terrain 14, and/or during a first part of the flare, based on the current measured slope gamma(t) of the aircraft 12, and, according to the invention, a second phase 112 for estimating a distance D2(*t*) traveled during a second part of flare of the aircraft 12, above the terrain 14, as a function of the current slope gamma(t) of the aircraft 12.

During the phase 110, the distance D1(*t*) traveled during the approach of the aircraft 12 toward the terrain 14, above the terrain 14, before flare and/or during the first part of flare, is calculated by the first estimating means 70 as a function of the current height H(t) of the aircraft 12 and its current slope gamma(t).

This calculation is for example done using one of equations (1) or (2) above.

Then, during phase 112, the distance D2(*t*) traveled in-flight by the aircraft, during a second part of flare of the aircraft 12, is calculated by the second estimating means 72, as a function of the current ground speed Vsol(t), the current airplane slope gamma(t), and the load factor nzarr of the aircraft 12 during flare, obtained from the performance database 58, for example using one of equations (3) or (4) above.

The first length LV(t) corresponds to the sum of the distances D1(*t*) and D2(*t*) obtained during phases 110, 112.

Step 104 includes a third phase 114 for calculating the distance D3(*t*) necessary for the transition, during the braking phase on the ground, from the current deceleration Jx(t) to the deceleration corresponding to an established braking Jx max, as a function of a constant Kms representing the dynamics of the aircraft 12 between touchdown of the main landing gear and the establishment of the established braking. The calculation of the distance D3(*t*) is further done as a function of the current deceleration Jx(t), and the deceleration corresponding to an established braking Jx max.

This distance D3(*t*) is calculated by the third estimating means 74, in particular using equation (5).

Step 104 further includes a fourth phase 116 for calculating a rolling distance D4(*t*) under established braking, based on the estimated deceleration profile Jx(Vsol(t),t) of the aircraft 12 on the terrain 14, and a determination of the stop time tstop of the aircraft 12.

To that end, a calculation of the stop time tstop of the aircraft 12 is done by the estimating means 74, using one of equations (6) or (7). The distance D4(*t*) is obtained by integrating the estimated deceleration profile Jx(Vsol(t),t) of the aircraft 12 on the terrain 14, advantageously using one of equations (8) or (9).

The second length LS(t) corresponds to the sum of the distances D3(*t*) and D4(*t*) obtained during the phases 114, 116.

During step 106, the third calculation unit 56 calculates the geographical coordinates $L_{pos\ stop}(t)$; $G_{pos\ stop}(t)$ of the stop point 16, as a function of the geographical coordinates $L_{A/C}(t)$; $G_{A/C}(t)$ of the aircraft 12, the bearing χ(t) taken equal to the airplane route, and the horizontal distance L(t) between the aircraft 12 and the stop point 16, obtained by taking the sum of the first length LV(t) and the second length LS(t) respectively obtained in steps 102 and 104.

As specified above, this position is calculated using a traditional formula, with the hypothesis of a spherical Earth.

In step 108, the management unit 82 of the display device 34 extracts the information received from the system 10, and in particular the position of the stop point 16, and dynamically displays, on the viewer 80, information representative of the position of that stop point 16, as described above.

The implementation of the method according to the invention greatly improves the precision of the estimated position of the stop point 16 of the aircraft 12 on the terrain 14, by taking the real-time evolution of the aircraft into account. In particular, using the airplane slope at each moment improves the estimate of the distance D2(*t*) traveled during flare of the aircraft 12 and contributes to increasing the precision of the estimate.

In one alternative, the system 10 includes, additionally or as a replacement for the display device 34, an alarm device capable of emitting an auditory alarm for the pilot, for example when the estimated stop position of the aircraft is situated beyond the position of the runway threshold 22.

In one alternative, the system 10 collects information in the avionics system 32 and/or in the databases 58 to determine additional parameters influencing the braking performance of the airplane, such as the operation of the airplane systems, in particular the braking system, and/or the operation and configuration of the lift elements.

In another alternative, when the approach toward the landing strip 18 is not rectilinear, the system 10 is capable of modeling the position of the stop point 16, based on an estimate of the curved projection of the approach trajectory on the horizontal plane.

In still another alternative, the system 10 takes the environment of the aircraft 12 into account, and in particular the relief present on the terrain 14, particularly to correct the measured current height H(t) and bring it back to the height with respect to the runway threshold 20.

In another alternative, the system 10 comprises means for the real-time estimate of the timeliness for the pilot of the aircraft 12 of performing a go-around maneuver, based on the position of the determined stop point 16.

Figure 5:
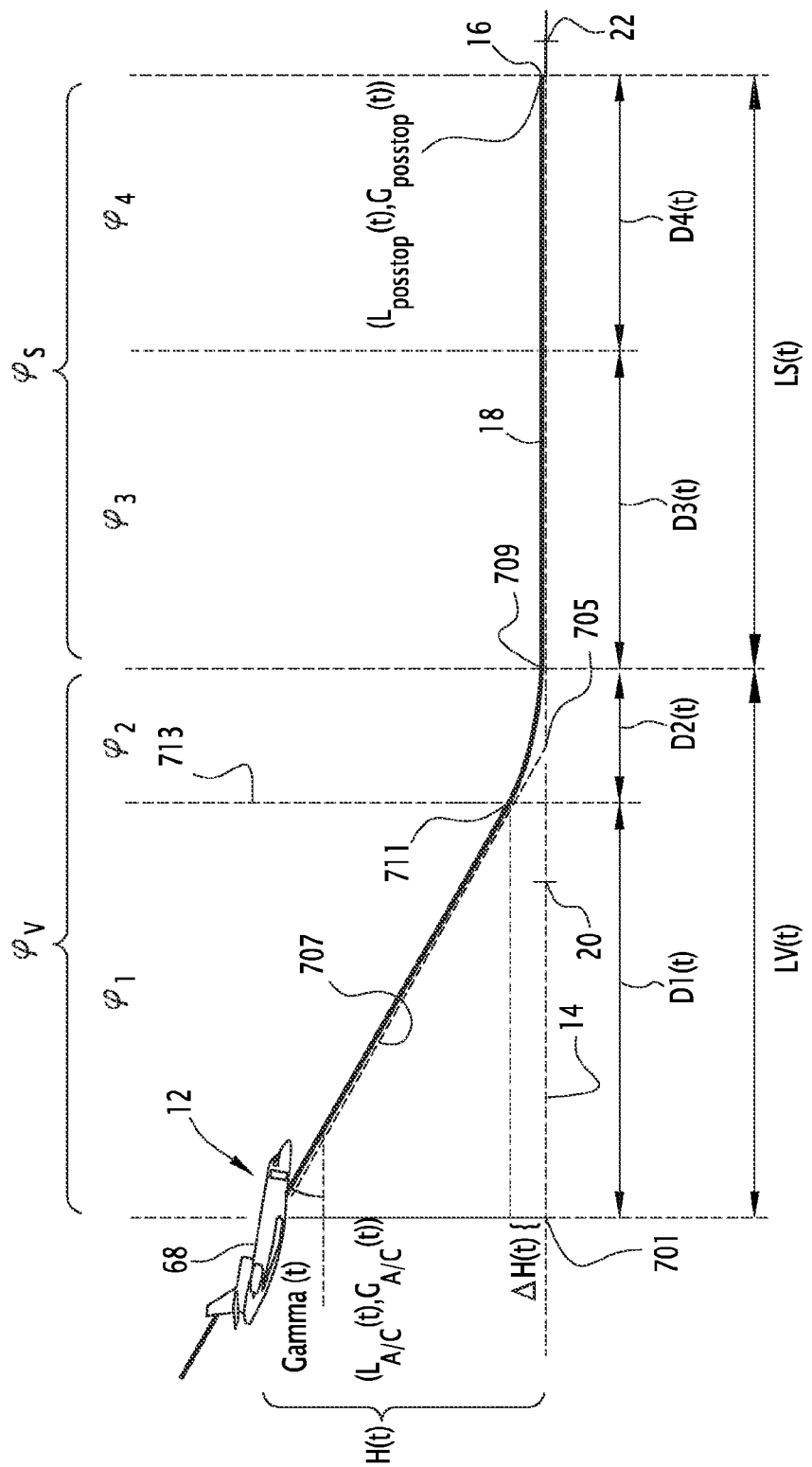
FIG. 5 is a view similar to FIG. 2, for a second embodiment of the method according to the invention.
Figure 6:
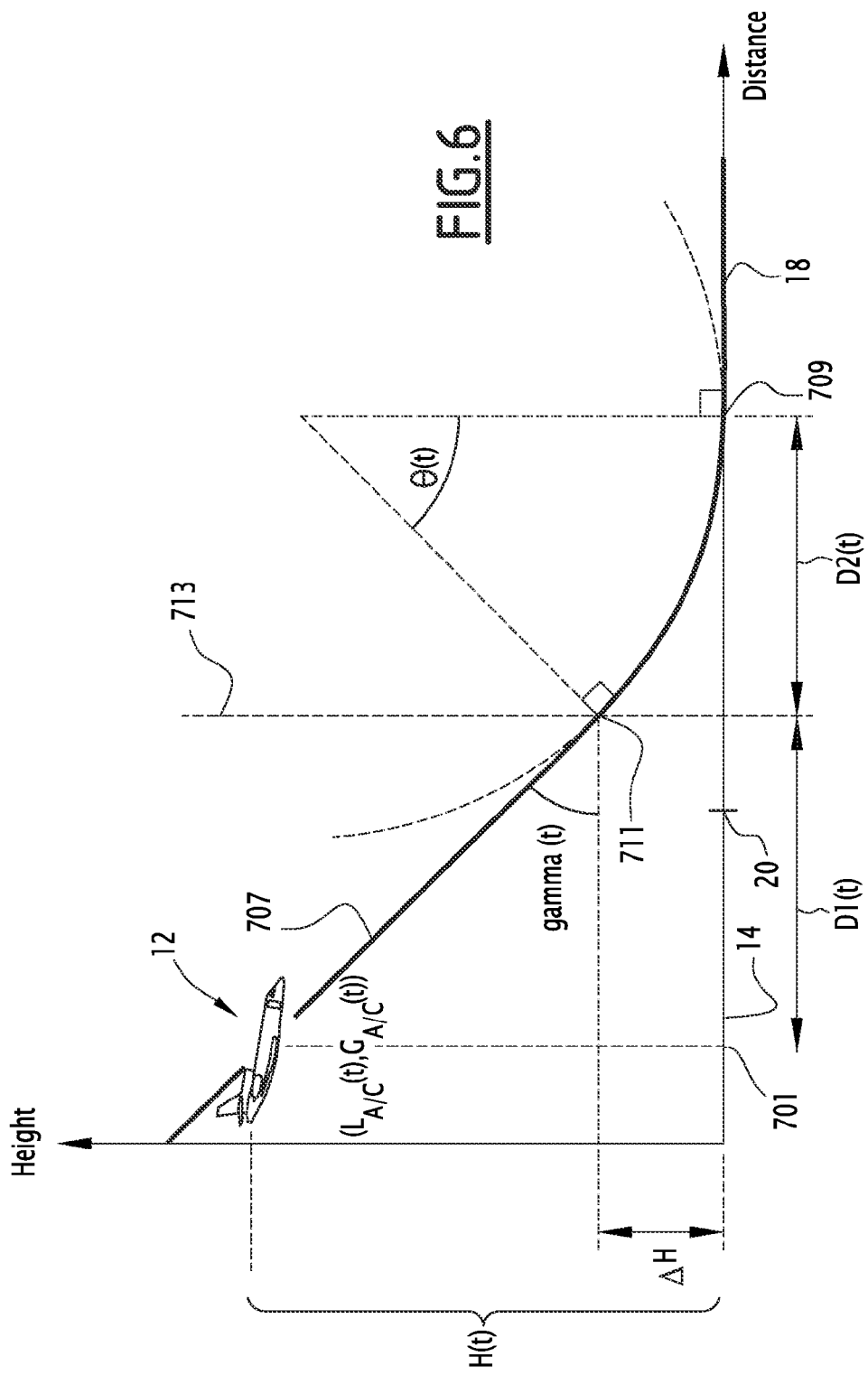
FIG. 6 is a view similar to FIG. 3 for the second embodiment of the method according to the invention.

Another embodiment of the invention is illustrated in FIGS. 5 and 6.

In this embodiment, the estimating means 70 estimate a first distance D1(*t*) corresponding to the distance separating the projection 701 on the terrain 14 of the aircraft in flight and the vertical plane 713 passing through the point 711 of the trajectory of the aircraft where the latter begins the flare phase $\phi_2$. The estimating means 72 estimate a second distance D2(*t*) corresponding to the distance separating the vertical plane 713 from the touchdown point of the wheel 709 of the aircraft on the terrain 14.

In this embodiment, the distance D1(*t*) is representative of the approach phase $\phi 1$, while D2(*t*) is representative of the entire flare phase $\phi 2$.

To that end, the estimating means 70 are capable of calculating a height ΔH(t) relative to the height of the runway threshold 20 for which the flare is done.

The height ΔH(t) is calculated as a function of the current ground speed $V_{sol}(t)$, the current airplane slope gamma(t), and the load factor $n_{zarr}$ of the aircraft 12, obtained from the performance database 58, and the acceleration of gravity g, for example using equation (12) below:

$$\Delta H(t) = \int_{gamma(t)-\beta}^{0} \frac{V_{sol}(t)^2}{g} \cdot \frac{1}{n_{zarr} - \cos(\gamma)} \cdot \sin(\gamma) \cdot d\gamma \quad (12)$$

The distance D1(*t*) is next calculated using the following equation:

$$D1(t) = \frac{h(t) - \Delta H}{gamma(t)} \quad (13)$$

The distance D1(*t*) is downwardly clipped by 0, to ensure that D1(*t*)=0 during flare.

Next, the distance D2(t) taking the flare into account is calculated at each moment as a function of the height ΔH(t) using the following equation:

$$D2(t) = \sqrt{\left[2 \cdot \frac{V_{sol}(t)^2}{g} \cdot \frac{1}{n_{zarr} - \cos(\text{gamma}(t))} \cdot \sin\left(\frac{\text{gamma}(t)}{2}\right)\right]^2 - [\Delta H]^2}, \quad (14)$$

or $$D2(t) = \sqrt{\left[2 \cdot \frac{V_{sol}(t)^2}{g} \cdot \frac{1}{n_{zarr} - \cos(\text{gamma}(t))} \cdot \sin\left(\frac{\text{gamma}(t)}{2}\right)\right]^2 - \left[\int_{\text{gamma}(t)-\beta}^{0} \frac{V_{sol}(t)^2}{g} \cdot \frac{1}{n_{zarr} - \cos(\gamma)} \cdot \sin(\gamma) \cdot d\gamma\right]^2} \quad (15)$$

The formulas for calculating D3(t) and D4(t) as well as the stop position remain unchanged relative to the embodiment previously described.

The invention claimed is:

1. A method for dynamically determining the position of the stop point of an aircraft on a terrain, comprising implementing, by a system configured for dynamically determining the position of the stop point, the following steps:
   dynamic measurement of the current geographical position of the aircraft, and its current ground speed;
   calculation of a first length representative of a flight phase of the aircraft, and calculation of a second length representative of a ground phase of the aircraft;
   calculation of the position of the stop point based on the first length, the second length and the current geographical position; and
   providing the position of the stop point to a communicator configured to provide communication as a function of the stop point to a crew of the aircraft;
   wherein the calculation of the first length comprises a phase for dynamically estimating a distance traveled by the aircraft during at least part of a flare phase of the aircraft;
   wherein the step of calculating the position of the stop point includes determining the geographical position of the stop point based on the current geographical position of the aircraft, the first length, the second length, and a reading ($\chi(t)$) corresponding to the route of the aircraft.

2. The method according to claim 1, comprising measuring the current slope of the aircraft, and calculating the distance traveled by the aircraft during at least part of a flare phase of the aircraft as a function of the current slope of the aircraft.

3. The method according to claim 1, comprising, during the estimation phase, estimating the distance traveled by the aircraft during at least part of the flare phase of the aircraft as a function of the current ground speed of the aircraft, measured during the measuring step.

4. The method according to claim 1, comprising, during the estimation phase, estimating the distance traveled by the aircraft during at least part of the flare phase of the aircraft as a function of the load factor ($n_{zarr}$) of the aircraft, estimated during flare thereof.

5. The method according to claim 2, comprising, during the estimation phase, estimating the distance traveled by the aircraft during at least part of a flare phase of the aircraft is estimated using the equation:

$$D2(t) = \int_0^{\text{gamma}(t)-\beta} \left[\frac{1}{g \times (n_{zarr} - \cos(\gamma))} \times V_{sol}^2(t) \times \cos\left(\gamma + \frac{d\gamma}{2}\right)\right] \cdot d\gamma$$

where g is the acceleration of gravity, β is the slope of the terrain, $n_{zarr}$ is the load factor of the aircraft estimated during flare, $V_{sol}(t)$ is the current ground speed of the aircraft and gamma(t) is the current slope of the aircraft.

6. The method according to claim 2, wherein the estimating phase includes calculating an estimated height (ΔH) of the aircraft at which flare begins, the distance traveled by the aircraft during at least part of a flare phase of the aircraft being calculated from the estimated height (ΔH).

7. The method according to claim 1, wherein calculating of the first length includes a phase for estimating a distance traveled during the approach of the aircraft toward the terrain before flare and/or during a first part of the flare phase of the aircraft, and calculating the distance traveled during the approach of the aircraft toward the terrain before flare and/or during the first part of the flare phase of the aircraft as a function of the current measured slope of the aircraft.

8. The method according to claim 7, comprising calculating the distance traveled during the approach of the aircraft toward the terrain before flare and/or during the first part of the flare phase of the aircraft, as a function of the current height of the aircraft relative to the terrain.

9. The method according to claim 1, wherein the step for calculating the second length includes a phase for calculating a distance representative of the transition from the current deceleration to the deceleration corresponding to an established braking of the aircraft, as a function of the current deceleration.

10. The method according to claim 9, comprising calculating the distance representative of the transition from the current deceleration to the deceleration corresponding to the established braking as a function of a constant $K_{ms}$ representative of the dynamics of the aircraft between touchdown of the main landing gear and the establishment of the established braking.

11. The method according to claim 1, wherein the step for calculating the second length includes a phase for calculating a braking distance from a predetermined deceleration profile ($J_{x\ tab}$) of the aircraft on the terrain, as a function of the current ground speed.

12. The method according to claim 11, wherein the predetermined deceleration profile ($J_{x\ tab}$) is a constant deceleration.

13. The method as recited in claim 1 wherein the communicator configured to provide communication as a function of the stop point to a crew of the aircraft is at least one of a display including a monitor in the airplane and an alarm configured for emitting an auditory alarm.

14. A system for dynamically determining the position of the stop point of an aircraft on a terrain, comprising:
   a dynamic measurer for dynamically measuring the current geographical position of the aircraft and its current ground speed;
   a first length calculator for calculating a first length representative of a flight phase of the aircraft, and a second length calculator for calculating a second length representative of a ground phase of the aircraft;
   a position calculator for calculating the position of the stop point based on the first length, the second length and the current geographical position, the position of the stop point being provided to a communicator configured to provide communication as a function of the stop point to a crew of the aircraft;

wherein the first length calculator comprises an estimator module for estimating a distance traveled by the aircraft during at least part of a flare phase of the aircraft, wherein the calculating the position of the stop point includes determining the geographical position of the stop point based on the current geographical position of the aircraft, the first length, the second length, and a reading ($\chi(t)$) corresponding to the route of the aircraft.

15. The system according to claim 14, wherein it includes a slope measurer for measuring the current slope of the aircraft, the estimator module being capable of calculating the distance traveled by the aircraft during at least part of a flare phase of the aircraft as a function of the current slope of the aircraft.

16. The system as recited in claim 14 wherein the communicator configured to provide communication as a function of the stop point to a crew of the aircraft is at least one of a display including a monitor in the airplane and an alarm configured for emitting an auditory alarm.

* * * * *